United States Patent [19]

Seaman

[11] Patent Number: 5,644,571
[45] Date of Patent: Jul. 1, 1997

[54] APPARATUS FOR MESSAGE FILTERING IN A NETWORK USING DOMAIN CLASS

[75] Inventor: Michael J. Seaman, San Jose, Calif.

[73] Assignee: Digital Equipment Corporation, Maynard, Mass.

[21] Appl. No.: 73,217

[22] Filed: Jun. 4, 1993

[30] Foreign Application Priority Data

Jun. 15, 1992 [GB] United Kingdom ............... 9212655.6

[51] Int. Cl.$^6$ .................................................. H04J 3/02
[52] U.S. Cl. .................................................. 370/401
[58] Field of Search .................... 370/85.13, 85.14, 370/85.12, 85.1, 85.4, 85.6, 112, 60, 94.1, 60.1, 62

[56] References Cited

U.S. PATENT DOCUMENTS

| | | | |
|---|---|---|---|
| 4,864,559 | 9/1989 | Perlman .................................. | 370/60 |
| 4,922,503 | 5/1990 | Leone .................................. | 370/85.13 |
| 4,933,938 | 6/1990 | Sheehy .................................. | 370/85.13 |
| 5,086,426 | 2/1992 | Tsukakoshi et al. .................. | 370/85.13 |
| 5,136,580 | 8/1992 | Yidelock et al. ....................... | 370/85.13 |
| 5,144,622 | 9/1992 | Takiyasu et al. ..................... | 370/85.13 |
| 5,214,646 | 5/1993 | Yacoby .................................. | 370/85.14 |
| 5,247,620 | 9/1993 | Fukuzawa et al. .................... | 370/85.13 |
| 5,251,205 | 10/1993 | Callen et al. ........................... | 370/60 |
| 5,280,480 | 1/1994 | Pitt et al. ............................... | 370/85.13 |
| 5,305,305 | 4/1994 | Harper et al. ......................... | 370/60 |
| 5,313,465 | 5/1994 | Perlman et al. ........................ | 370/85.13 |
| 5,345,587 | 9/1994 | Fehskens et al. ...................... | 395/650 |
| 5,361,256 | 11/1994 | Doeringer et al. ..................... | 370/60 |
| 5,383,187 | 1/1995 | Vandakas et al. ...................... | 370/94.1 |
| 5,396,493 | 3/1995 | Sugiyama .............................. | 370/60 |
| 5,434,845 | 7/1995 | Miller .................................. | 370/13 |

FOREIGN PATENT DOCUMENTS

0508886A1 10/1992 European Pat. Off. ........ H04L 12/46

Primary Examiner—Douglas W. Olms
Assistant Examiner—Shick Hom
Attorney, Agent, or Firm—Kenneth F. Kozik

[57] ABSTRACT

In an apparatus in a computer network, message filtering proceeds by generating respective class specifiers from a received message, using the message source field, message destination field, and type of message field. The class specifiers are used for generating a class specification, and a domain class is generated from the class specification. A domain list is generated to provide a list of ports to which a message directed to the domain class is to be forwarded. The message is forwarded to the ports listed in the domain list. The apparatus may be a bridge, router, etc.

12 Claims, 1 Drawing Sheet

APPARATUS FOR MESSAGE FILTERING IN A NETWORK USING DOMAIN CLASS

RELATED APPLICATIONS

This application claims priority pursuant to 35 U.S.C. § 119 from United Kingdom Patent Application No. 9212655.6, filed Jun. 15, 1992.

FIELD OF THE INVENTION

The present invention relates to digital communication systems, and particularly though not necessarily exclusively to computer communication systems.

BACKGROUND

A communication system of this type has generally to provide communication between a substantial number of units which we will term end units, each of which may be assumed to have a globally unique address. In general, any end unit may want to send a message to any other end unit. Two general types or levels of communication system have become established for this purpose: switching networks and area networks.

In a switching network, there is a plurality of switching devices termed routers with various paths connecting the routers to the end units and to each other. The routers collectively have the responsibility for finding a path through the network between any two end units (source and destination). The routers therefore maintain various tables by means of which they can determine the required route for the message.

In a simple area network, there is a single communication channel to which all the end units are connected. Every end unit which wants to send a message puts the message on the communication channel, and each unit monitors the communication channel continuously for messages with its own address as destination. (A complication is that there is a need for some form of collision detection. A unit will not try to transmit a message if some other unit is already transmitting, but it is possible that two units might try to transmit messages simultaneously, in which case both transmissions must be aborted).

Each device attached to the network has an address which is unique (most device manufacturers and network managers conform to conventions which ensure this). A message directed to that device has that address included as a destination address field in the header of the message, and the device includes hardware which monitors all messages in the network for its own address.

The first major form of area network to be introduced on a large scale was termed a local area network (LAN), which was restricted to a physically small area (of dimensions of the order of 100 m).

Techniques for connecting LANs to switching networks were soon developed, wherein routers are coupled to LANs. As far as the switching network is concerned, each LAN is treated as a complex (multi-address) end unit. (A complication is that a LAN may often be coupled to more than one router; this requires the switching network to be able to cope with multiple possible paths).

The use of area networks has however expanded beyond the limitations of the original LAN systems.

One development is concerned with areas which are physically much larger. For this, various characteristics of the original LAN systems have been modified, to produce what are termed wide area networks (WANs). For present purposes, there is no fundamental distinction between LANs and WANs.

A more important development has been the linking of separate LANs by means of bridges; we shall call such a network an extended network and the individual LANs of the extended network its component networks. One reason for the development of this technique is to allow originally independent LANs to be connected together. The basic function of a bridge is to act as a store and forward device, passing messages from each of the LANs to which it is connected to the other LAN.

One problem which arises with such extended networks is that of network loading. With a network as described so far, all units use a common communication channel, which has a limited message carrying capacity. This therefore limits the size of an area network (ie the number of end units which it has). If an area network is an extended network consisting of a number of component networks coupled together by simple bridges, then all messages are propagated throughout the extended network, so the size of network which can be formed in this way is limited.

In the simplest form of system, each device has a single unique address. However, there are two possible modifications of this. It may be desirable to assign two or more addresses to a single device. But more importantly, it is sometimes desirable to send messages not to a single device but to all devices (termed broadcasting). For this, each device needs to be given not only its own unique address(es) but also a broadcast address shared with all other devices. It is also sometimes desirable to send messages to a particular group of devices (termed multicasting). For this, all devices of the group need to share a common multicast address. Further, it may be desirable to have a number of different multicast groups, with some devices belonging to several multicast groups.

The hardware address recognition circuitry of a device can obviously be expanded to recognize a number of different addresses, which may be of different types (unique and multicast—broadcast messages do not require address recognition). However, this increases the complexity of the devices. It is therefore common for certain relatively simple types of end unit to rely on software rather than hardware to determine whether messages are directed to the unit. A high message density can thus impose substantial processing loads on such end units.

It has been recognized that much of the message traffic on an extended network is between end units coupled to the same LAN of the network. It has therefore become known to provide the bridges between the different LANs of such a network with some form of filtering, which is intended to discriminate between messages which do and do not need to be passed through the bridge and to pass only the former.

To achieve this, the bridge must do more than act purely as a message transmission device which is effectively transparent. It must incorporate some means for examining the messages reaching it to determine whether or not to pass them on.

To understand the manner in which such filtering is achieved, the structure of messages in area networks must be considered in more detail. There is a number of different message formats, developed by different organizations. However, the general structures of these formats are sufficiently similar to allow them all to be used on the same network (in particular, they have a common header structure as far as the source and destination addresses are concerned).

The different formats contain keys which allow them to be distinguished. In addition to this, there are various message types or classes, such as date messages and various kinds of control messages, or individual, multicast, and broadcast, again distinguished by suitable keys. These latter keys may be regarded either as bits forming part of the addresses or as components of the message type or class. We shall use the term protocol identifier for the combination of all these components.

The main known bridge filtering technique is termed blackball filtering. In this, a number of specific values or characteristics for different component (source address, destination address, and protocol identifier) of the messages are specified. (This technique includes the more specific techniques of protocol, type filtering, destination filtering, and source filtering.)

In practice, the address structure of a network is normally largely hierarchical, so that the address of a particular end unit may for example be a sequence of elements consisting of a region identifier in the area network, a LAN identifier, a unit type identifier (eg PC, workstation, loadserver, communications server, etc) and a unit identifier. The filter value for an address may be any selected combination of source and/or destination address elements. Similarly, protocol and/or message types can consist of separate elements, and the filter value for these may consist of any selected combination of elements.

The filter mechanism stores these filter values and matches them against each message received by the bridge. If all the elements match, the message is filtered out, ie not transmitted by the bridge.

The filter mechanism can store a plurality of sets of values, matching each set against each incoming message. The message ie filtered out if it matches any of the stored sets of values. In other words, each set of values votes on the message, with a match producing a No vote; a single No vote "blackballs" (vetoes) the message, preventing it from being transmitted.

This filtering technique has some significant disadvantages, and the general object of the present invention is to provide an improved filtering technique which alleviates or overcomes these disadvantages.

A further problem arises with multiport bridges that is, with bridges which have more than 2 ports. There are broadly three possible modes of implementing filtering with such a bridge: bridge-based, port-based, or port-to-port. For bridge-based filtering, a single filter test is applied to all incoming messages regardless of which port they are received on, and each message is either transmitted to all ports or not transmitted at all. For port-based filtering, a separate filter test is applied to each port, and a message is transmitted or not depending on whether or not the test produces a match. This port-based filtering has three variants, depending on whether the filtering is applied to incoming messages, outgoing messages, or both. For port-to-port filtering, the bridge is treated as a group of 2-port bridges, each of which is filtered separately.

These three multiport techniques all have drawbacks. Bridge-based filtering is obviously extremely crude, and setting up the bridge so that it does not block the passage of any messages which must be allowed to pass through it results in a very low efficiency, ie only a small proportion of messages are blocked. Port-based filtering improves on this, but its efficiency is still limited since for each port, the filter must be coarse enough to allow through all messages which are to be sent to any other port (or all messages which may be received from any other port). Port-to-port filtering achieves the same efficiency as filtering for a 2-port bridge, but can easily be expensive or impossible to implement for bridges with a large number of ports, as a number of port-to-port pairs is proportional to the square of the number of ports.

The object of the present invention is to provide an improved bridge filtering technique, particularly though not exclusively applicable to multiport bridges with a large number of ports (eg 256 ports).

Underlying the present invention, there is a novel principle or concept, of domains and domain classes.

For a given message, a reachability domain (or simply domain) is the region of a network which that message needs to reach. The region consists of those component networks of the total (extended) network having potentially connected to the end units which need to receive that message (plus any more component networks required to make the domain connected, so that it does not consist of two or more parts not connected to each other). This domain is obviously the domain for all messages with identical characteristics (source address, destination address, and protocol identifier). Also, it may happen that there is a single domain common to messages with characteristics which are different. (In practice, the characteristics of the messages will probably vary only in certain respects.)

Since the message characteristics include the protocol identifier, different messages sent from a given unit may have different domains.

It is often useful to broaden the concept of a domain to describe the reachability component networks not just of messages with identical characteristics but of messages with similar characteristics, ie for which only some of the characteristics are identical. Thus the domains for two similar end units on the same component network will normally be the same.

One can also consider the domains for messages having the same protocol identifier. This is a further broadening of the concept of domains, since different messages having the same protocol identifier may not necessarily have the same domain. In particular, it may be desirable for a bridge to be asymmetric for some protocol identifiers. The domain for messages having the same protocol identifier can then be divided or factored into more limited domains for these different messages. These more limited domains can be distinguished by including the source address (which can in turn indicate the type of unit) as an essential part of the message characteristics.

It is convenient to group the domains into domain classes, though in a simple system, domains and domain classes can be the same. The domain classes are chosen so that all messages in the same domain class can be treated in the same way. The domains in a domain class are normally disjoint. For effective operation, it is important that each domain class should contain only one address/protocol type.

In the present system, a bridge contains domain assignment means for determining, from the characteristic of a message, a domain class; means for storing, for each output port, a set of domain classes; and means for transmitting the message on each output port for which the domain class of the message matches a stored domain class for that port. The means for determining domain classes preferably utilizes look-up tables, and the matching for the output ports preferably permits partial matching (ie allows "don't care" elements).

It will be realized that this technique is more abstract than the standard filtering techniques such as the blackball technique. When applied to a simple 2-port bridge, it involves a 2-stage process of first classifying the incoming message to generate a domain class and then matching the domain class. The second step of matching can be regarded as broadly analogous to the filtering of the blackball technique. The first step of classifying allows considerable generalization which is not feasible with simple blackball matching.

When applied to a multiport bridge, the present system is broadly similar to part filtering systems. The second step of the present system is broadly similar to output port filtering. The first step of the present system has some similarity with input port filtering to the extent that it is applied at input ports, but the present process of classification into domain classes has in itself little similarity with standard filtering.

Accordingly the present invention provides, in or for a bridge in an area network, message filtering means comprising means for generating respective class specifiers from the message source, message destination, and type of message; means for generating a class specification from the class specifiers; means for generating a domain class from the class specification; means for generating a domain list from the domain class; and means for generating a list of ports from the domain list.

Preferably, the generating means is provided by respective look-up means.

This means for generating, from the class specifiers, a class specification and the look-up means for generating, from the class specification, a domain class may comprise a single look-up table. The means for generating, from the class specifiers, a class specification may comprise concatenating means, or may alternatively comprise algorithmic logical combination means.

The message filtering means may also include dynamic filtering means the output of which is combined with the list of ports.

The invention also provides a bridge comprising a plurality of line cards, each including a respective processor and having at least one communications interface having a plurality of ports, coupled together by means of a bus and a common memory controlled by a central bridge processor, including the above message filtering means. At least some of the bridge ports may be logical ports. The look-up means may be contained in the common memory and the central bridge processor, or be distributed between the line cards, or be duplicated between the line cards. The look-up means on each line card may comprise a single look-up table encoding three transformations, so that its input is a class specification and its output is a reachability domain.

The present invention further provides, in or for a bridge in an area network, a method of filtering messages comprising generating respective class specifiers from the message source, message destination, and type of message; generating a class specification from the class specifiers; generating a domain class from the class specification; generating a domain list from the domain class; and generating a list of ports from the domain list.

BRIEF DESCRIPTION OF THE DRAWINGS

A bridge including filtering means embodying the invention will now be described, by way of example, with reference to the drawings, in which.

DETAILED DESCRIPTION

Figures 1, 2:
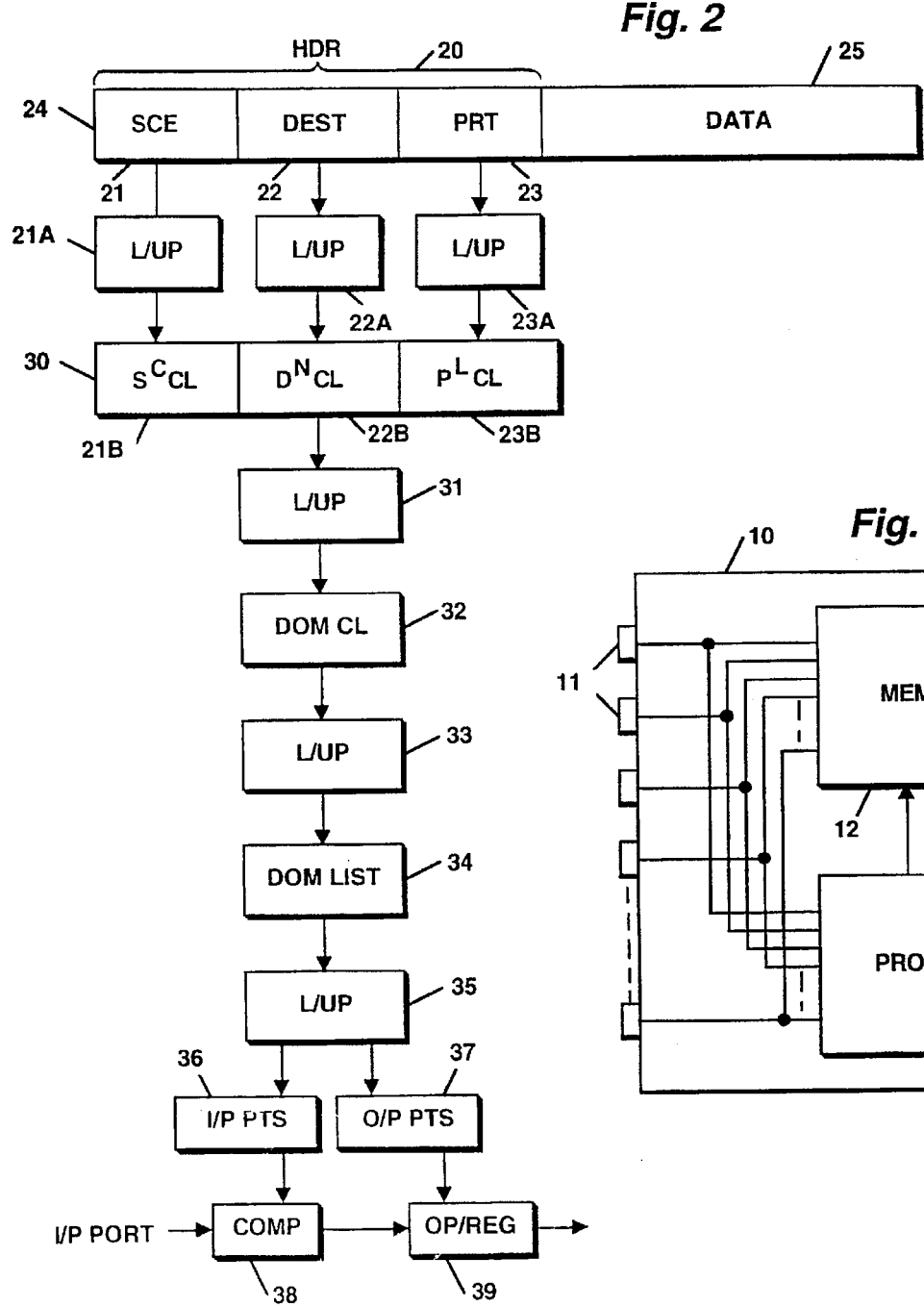
FIG. 1 is a block diagram of the bridge.
FIG. 2 is a block diagram of the filtering circuitry of the processor.

Referring to FIG. 1, a bridge 10 has a plurality of ports 11, each of which may be connected to an area network. We will assume that the format of a message is as shown in FIG. 2, consisting of a source address 21, a destination address 22, a protocol type 23, these three portions together forming a header 20, and a data portion 25. (The precise structure of a message may be different, but it can notionally be arranged as shown.) When a message is received, it is passed to a memory 12, and in addition, its header is passed to a processor 13. Ignoring filtering for the moment, the processor 13 determines, from the destination address of the header, which port or ports the message should be transmitted to and causes the message to be passed to those ports from the memory 12.

The processor 13 also performs the filtering, the circuitry for this being shown in FIG. 2. The header of the message is held in a register 24, consisting of the three portions 21 to 23 as mentioned above. Each of these portions feeds a respective one of three look-up tables 21A to 23A, the outputs from which are fed to a source class, destination class, and a protocol class register respectively, these three registers together forming a register 30. The register 30 feeds a look-up table 31, the output of which is fed to a domain class register 32. This feeds a further look-up table 33, which in turn feeds a domain list register 34. This in turn feeds a look-up table 35, which feeds an input list register 36 and an output list register 37. An enable circuit 38 is fed from the input list register 36 and with the number of the input port, ie the port on which the message has been received, and if there is a match, it enables the output port register 39.

The source address (which we are regarding as including an identification of type of end unit, eg PC, workstation, communication server, etc.) is typically several bytes long. The look-up table 21A generates, from this, a source class, which may conveniently be 3 bits long. The source classes may be given convenient names (preferably including an "other unspecified" class), and will generally depend primarily on the end unit type. The look-up table effectively implements an algorithm which compresses large ranges of the source address.

The destination address is similarly converted by the look-up table 22A into a destination class. The destination classes may conveniently be termed "Unspecified destinations", "Always filtered", etc.

The protocol identifier is similarly converted by the look-up table 23A, into a protocol class. The protocol classes may conveniently be named according to the functions which the message type perform.

The source, destination, and protocol classes (each of 3 bits) concatenated in the register 30 are converted into a domain class (also of 3 bits) by the look-up table 31. The domain classes may conveniently be termed "Flood", "Bridge Filtered Traffic", etc.

The look-up table 33 contains a listing of domains for each domain class, and the list of domains is passed into the domain list register 34. The look-up table 34 expands from input to output (in contrast to the previous look-up tables), containing a list of up to 64 domains for each of the 8 domain classes.

The look-up table 35 contains a listing of input ports and output ports for each domain, and thus expands from domain number to the two port lists, like table 33. This table is looked up repeatedly, for each of the domains in register 34, with the ports for successive domains being accumulated in the two registers 36 and 37.

Finally, the port on which the message came into the bridge is matched against the input port list in register 36. If the port on which the message came into the bridge is one of those in the list in register 36, the ports in the output port register are read out and the message is sent out from the memory 12 to each of those output ports.

The system described above is a relatively simple embodiment of the present invention. It may be desirable to apply the principles of the present invention in a more elaborate manner and to a more complex form of bridge. Various aspects of doing this will now be described.

We will first describe the general process of filtering.

As a preliminary point, the filtering of the present system, and described so far, is static, in that it is determined once and for all by tables or other means permanently set up in the bridge. In addition to this filtering, there may also be dynamic filtering. In this, lists are dynamically maintained in the bridge of addresses which are accessible from the various ports. In simplified terms, if the bridge receives a message from a device via a particular port, it records the fact that that device is accessible via that port; and entries in the dynamic filtering tables are deleted if they are not refreshed at suitable intervals.

On the reception of a message, the following sequence of events occurs:

1. Each of the filtering information elements (the source address, the destination address, and the message type protocol, etc) is looked up in the appropriate filtering database, each look-up returning a class specifier.

2. The class specifiers are combined to yield an overall class specification.

3. The class specifier is then used to look up the domain class. The mapping from class specifiers to domain classes is normally many to one; this makes the derivation of the class specification from the class specifiers easier.

4. The domain class and the inbound port are then combined to obtain (by look-up) the reachability domain. (It is possible to use a single table to obtain the reachability domain directly from the class specification and the inbound port, with duplicated entries for equivalent class specifications.)

5. The outbound port set is then looked up using the reachability domain.

6. The inbound port is deleted from the outbound port set. It is obviously unnecessary to send the message out on the same port that it has been received on.

7. If there is dynamic filtering and this has selected a specific outbound port, a check is made to see whether that port is included in the outbound port set. If it is, then the message is sent out on that port only; if it is not, then the message is not forwarded at all. If no port is selected by the dynamic filtering, then the message is sent out on all ports of the outbound port set.

The class specifiers as described above have been combined by simple concatenation. This results in a somewhat lengthy combined specifier. It may therefore be preferable to combine the individual specifiers logically, in a manner which is independent of the order in which the individual specifiers are taken. For this, it is convenient to take each specifier as consisting of say 8 elements, each of which can take the values 0, X, and 1, with the specifiers being combined by combining corresponding elements according to the rule that any 0 element or all X elements forces a resultant 0, but any 1 forces a resultant 1.

This can conveniently be implemented by representing each element by 2 bits, say P and V, so that the three element values correspond to the combinations

|   | P V |
|---|-----|
| O | O X |
| X | 1 1 |
| 1 | 1 0 |

The combination of the three elements (1 to 3) can then be achieved by two ANDs and an Inhibit, thus:

$$V = V_1 . V_2 . V_3$$

$$P = P_1 . P_2 . P_3$$

$$C = P.V.$$

If the class specifiers are 8 elements, they can be stored as 16 bit words, with the P bits in one half of the word and the V bits in the other half. The calculation of the resultant Ps and Vs can then be done in parallel using a 16-bit ALU, followed by inversion of the upper half of the resultant and ANDing with the lower half to give a final 8-bit specifier.

The more complex bridge consists of a number of line cards, each of which is operated by a respective processing engine (processor) and provides one or more communications interfaces. These line cards are coupled to each other through a shared medium comprising a bus and a common memory, controlled by a central bridge processor. The line cards may be of a variety of different types. Each line card may support a number of bridge ports, some of which may be logical ports (ie associated with multiplexed service rather than physical hardware).

The filtering requires various filtering databases (the look-up tables) and also processing of those databases. Depending on circumstances, the filtering databases may be held and the processing may be performed in the line cards and/or in the bridge processor and associated memory (possibly with some duplication). It may be convenient to keep some database tables in the bridge processor and associated memory and others in the line cards. It may also be convenient in some circumstances to combine some of the tables.

Thus for a line card with a small number of ports (physical and/or logical), it will usually be convenient to keep a single class specification table per port, encoding three transformations, so that its input is a class specification and its output is a reachability domain.

For systems with many line cards each of which has a large number of bridge ports, it may be convenient to keep, for the line card, a class domain table giving a look-up from class specifier to domain class, and a reachability port group table, giving a look-up from reachability domain to output port group set (which can conveniently be stored as a bit map). There will also be, for each port, a domain reachability table, giving a look-up from domain class to reachability domain.

Each line card will also contain a reachability port group table, giving a look-up from reachability domain to output port set.

Following the receipt of a message, a line card sends to the central database the following information:

for destination address look-up, the database identifier of the address database, the received destination address, and read requests for dynamic and static destination address information;

for source address look-up, the database identifier of the address database, the received source address, and a read request for static source address information;

for protocol identifier look-up, the protocol identifier of the protocol database, the received protocol identifier, and a read request for database information.

These database enquiries are independent. The returned information consists of a return code (entry found or not found) for each enquiry, a port number of a reserved value (indicating no port found) for the dynamic database enquiry, and, for each enquiry, the appropriate class specifier (destination, source, and protocol).

The frame is forwarded to each member of the outbound port group set, as identified using the class specification group tables. The forwarded frame is tagged with the reachability domain, and a destination line card which supports multiple ports uses this to select which ports the frame is actually to be transmitted through.

Summarizing briefly, the present system is a system for filtering messages passing through a bridge in an area network (eg a LAN or WAN), to minimize the extent to which messages reach parts of the network where they are not required. The source 21, destination 22, and type 23 of the message 20 are used to look up, in look-up tables 21A–21C, respective class specifiers 21B–23B. These are combined to form a class specification, which may be a simple concatenation or an algorithmic combination. From the class specification, a domain class 32 is obtained by means of a look-up table 31; from the domain class, a domain list 34 is obtained by means of a look-up table 33; and from the domain list, lists of input ports 36 and output ports 37 is obtained by a look-up table 35. The input port is checked against the input port list and, if there is a match, the message is sent to the ports in the output port list.

The invention has been described above in terms of bridges in area networks. However, the same principles can also be applied in other message systems. For example, the principles can be applied in switched message systems using routers. Although standard router systems generate determinate routes for messages, a need is becoming felt for router systems with some form of multicasting (and/or broadcasting), and some control over the extent to which messages can propagate through the system may therefore be desirable. Further, application of the present principles may be useful in such systems in simplifying various routing information look-up systems in the routers. The present principles may also find application in, for example, mail gateways. In such systems (as well as in other message systems), the present principles may also be useful with regard to security; for this purpose, domains can be defined to include certain end units or end unit identifiers but to exclude, for example, ports which may be insecure.

I claim:

1. In an apparatus in an area network, message filtering means to direct a received message to at least one port for transmission there-through comprising:

means for generating respective class specifiers for said received message from a contents of a message source field, a message destination field, and a type of message field;

means for generating a class specification from the class specifiers;

means for generating a domain class from the class specification, said domain class having fewer entries than said class specifiers;

means for generating a domain list from the domain class, said domain list having more entries than said domain class, said domain list representing a subarea in the area network to which a message is to be sent; and means for generating a list of ports from the domain list, said list of ports selected to have said message transmitted there-through.

2. Message filtering means according to claim 1 wherein each of the generating means is provided by respective look-up means.

3. Message filtering means according to either claim 1 or claim 2 wherein the means for generating a class specification from the class specifiers, and the means for generating a domain class from the class specification, comprises a single look-up table.

4. Message filtering means according to either claim 1 or claim 2 wherein the means for generating a class specification from the class specifiers includes concatenating means.

5. Message filtering means according to claim 1 or claim 2 wherein the means for generating a class specification from the class specifiers comprises algorithmic logical combination means.

6. Message filtering means according to claim 1 or claim 2 further comprising dynamic filtering means, the dynamic filtering means output combined with the list of ports.

7. Message filtering means according to claim 3 wherein the means for generating a class specification from the class specifiers includes concatenating means.

8. Message filtering means according to claim 3 wherein the means for generating a class specification from the class specifiers comprises algorithmic logical combination means.

9. Message filtering means according to claim 3 further comprising dynamic filtering means, the dynamic filtering means output combined with the list of ports.

10. Message filtering means according to claim 4 further comprising dynamic filtering means, the dynamic filtering means output combined with the list of ports.

11. Message filtering means according to claim 5 further comprising dynamic filtering means, the dynamic filtering means output combined with the list of ports.

12. In an apparatus in an area network, a method of filtering messages comprising the steps of:

generating respective class specifiers from a message source field, a message destination field, and a type of message field;

generating a class specification from the class specifiers;

generating a domain class from the specification, said domain class having fewer entries than said class specifiers;

generating a domain list from the domain class, said domain list having more entries than said domain class, said domain list representing a subarea of the area network to which a message is to be sent; and generating a list of ports from the domain list, said list of ports selected to have said message transmitted there-through.

\* \* \* \* \*